United States Patent
Fathi et al.

(10) Patent No.: US 10,492,140 B2
(45) Date of Patent: Nov. 26, 2019

(54) AUXILIARY PATH FOR LOW-POWER DEVICE WAKEUP

(71) Applicant: Verily Life Sciences LLC, Mountain View, CA (US)

(72) Inventors: Maryam Fathi, Palo Alto, CA (US); Johan Vanderhaegen, Cupertino, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/987,457

(22) Filed: May 23, 2018

(65) Prior Publication Data
US 2018/0343615 A1 Nov. 29, 2018

Related U.S. Application Data

(60) Provisional application No. 62/509,985, filed on May 23, 2017.

(51) Int. Cl.
*H04W 52/02* (2009.01)
*H04L 27/02* (2006.01)
*H04W 4/80* (2018.01)

(52) U.S. Cl.
CPC ... *H04W 52/0229* (2013.01); *H04W 52/0274* (2013.01); *H04L 27/02* (2013.01); *H04W 4/80* (2018.02)

(58) Field of Classification Search
CPC ............. G06K 7/0008; G06K 19/0723; G06K 19/07749; G06K 7/10366; G06K 19/0701; G06K 19/0724; G06K 19/0707

USPC ....................................................... 340/10.33
See application file for complete search history.

(56) References Cited

U.S. PATENT DOCUMENTS

| | | | |
|---|---|---|---|
| 4,955,038 A | 9/1990 | Lee et al. | |
| 6,693,511 B1* | 2/2004 | Seal ........................... | G01S 5/10 340/10.1 |
| 9,059,597 B2 | 6/2015 | Woo et al. | |
| 9,245,158 B2* | 1/2016 | Gudan ............... | G06K 7/10207 |
| 9,307,490 B2 | 4/2016 | Sun | |
| 9,432,941 B2 | 8/2016 | Li et al. | |
| 2005/0237160 A1* | 10/2005 | Nolan ................. | G06K 19/0705 340/10.33 |
| 2005/0237161 A1* | 10/2005 | Lee .......................... | B60R 25/24 340/10.33 |
| 2009/0275302 A1* | 11/2009 | Huston ..................... | H04B 1/24 455/231 |
| 2012/0214417 A1 | 8/2012 | Woo et al. | |

(Continued)

*Primary Examiner* — Mark S Blouin (57) ABSTRACT

The technology described herein relates to auxiliary wakeup for low-power devices. In an implementation, an auxiliary path for waking up a radio frequency (RF) radio of a low-power device is disclosed. The auxiliary path includes peak detector circuitry, pattern detector circuitry and a battery switch. The peak detector circuitry is operable to detect the presence of a RF field at a RF antenna of the low-power device. The pattern detector circuitry is enabled by the presence of a RF field and is operable to detect a time pattern in an amplitude envelope of a wakeup signal received at the RF antenna of the low-power device. The battery switch is operable to connect battery power to a RF radio of the low-power device when the time pattern is detected. Once powered, the RF radio establishes communication with a wakeup device.

19 Claims, 7 Drawing Sheets

(56) References Cited

U.S. PATENT DOCUMENTS

2014/0062671 A1 3/2014 Gudan et al.
2014/0062672 A1* 3/2014 Gudan ............... G06K 19/0715
340/10.33

* cited by examiner

AUXILIARY PATH FOR LOW-POWER DEVICE WAKEUP

BACKGROUND

Factory (or factory line) programming low-power devices such as wearables, medical devices, and the like, requires bidirectional communication between the programming device and the low-power device(s) being programmed. The low-power devices typically have a built-in radio frequency (RF) radio for transferring data. For example, many low-power devices in the healthcare, fitness, security, and medical industries utilize Bluetooth low energy (BLE or Bluetooth Smart) radios to transfer data. Many of these devices such as, for example, medical devices, have non-replaceable batteries with limited lifetime capacity. Prior to deployment of these devices, but before and after factory programming, it is often desirable to disable the RF radio, e.g., put the device in a sleep mode, to avoid current leakage which can significantly lower the shelf life of the device.

There are various mechanisms capable of waking up devices in a sleep mode. However, these mechanisms typically rely on technologies such as Near-field communication (NFC) and Radio-frequency identification (RFID) to facilitate the wakeup techniques. Unfortunately, these techniques are expensive both in terms of increased production costs and increased size or printed circuit board (PCB) area. Moreover, communications using NFC and RFID technology can compromise performance of the underlying RF antenna on the low-power device.

Overall, the examples herein of some prior or related systems and their associated limitations are intended to be illustrative and not exclusive. Upon reading the following, other limitations of existing or prior systems will become apparent to those of skill in the art.

SUMMARY

Examples discussed herein relate to auxiliary wakeup for low-power devices. In an implementation, an auxiliary path for waking up a radio frequency (RF) radio of a low-power device is disclosed. The auxiliary path includes peak detector circuitry, pattern detector circuitry and a battery switch. The peak detector circuitry is operable to detect the presence of a RF field at a RF antenna of the low-power device. The pattern detector circuitry is enabled by the presence of a RF field and is operable to detect a time pattern in an amplitude envelope of a wakeup signal received at the RF antenna of the low-power device. The battery switch is operable to connect battery power to a RF radio of the low-power device when the time pattern is detected. Once powered, the RF radio establishes communication with a wakeup device.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

The technology described herein is directed to an auxiliary wakeup path for low-power device wakeup and, more particularly, to a wakeup circuit that uses an existing RF antenna or pins of an existing antenna for waking up a low-power device, e.g., temporarily waking a RF radio for factory programming. The RF radio can be a BLE radio, a Wi-Fi radio, or any other common RF radio. Because the auxiliary wakeup path utilizes the existing RF antenna (or pin) and requires minimal circuitry that can be incrementally enabled, the described technology is low-power and occupies a small form factor on a PCB. Furthermore, unlike NFC and RFID solutions, the wakeup circuit discussed herein does not compromise performance of underlying RF communications.

In some embodiments, some or all components of the auxiliary wakeup path can be powered by harvested energy, e.g., powered by the received RF signals. Such system can further reduce battery drainage and, thus, further increase shelf life of low-power devices.

In some embodiments, the auxiliary wakeup path monitors the existing RF antenna for the presence of any RF field and enables pattern detector circuitry when a RF field is detected. Once enabled, the pattern detector circuitry looks for time patterns in an amplitude envelope of a received RF signal. If a detected time pattern matches a known (or pre-set) pattern, then a battery is connected to the RF radio (to provide power the RF radio) and the auxiliary wakeup path is disabled, e.g., by grounding the input to the auxiliary wakeup path.

Once the RF radio is enabled, if the RF radio has both transmit and receive capabilities, the RF radio commences bidirectional wireless communication, e.g., with a programming device to perform factory programming. However, if the RF radio is transmit-only, the RF radio transmits beacons that are received by a programming (or remote) device. The auxiliary wakeup path is then re-enabled and the programming device sends data to the low-power device through amplitude shift keying (ASK) time pattern signals, e.g., 100% ASK time pattern signals. Using this scheme, the auxiliary wakeup path can enable bidirectional communication with a transmit-only RF radio, i.e., the low-power device receives data via the auxiliary wakeup path and transmits data via the RF radio. With a transmit-only RF radio, the achievable throughput is typically lower than a bidirectional RF radio. However, because receiving data via the auxiliary wakeup path is very low power (and the high power transmit path is only enabled only for transmitting communications), the overall idle current of the system is lower and, thus, less power is consumed by the low-power device during communications.

Figure 1:
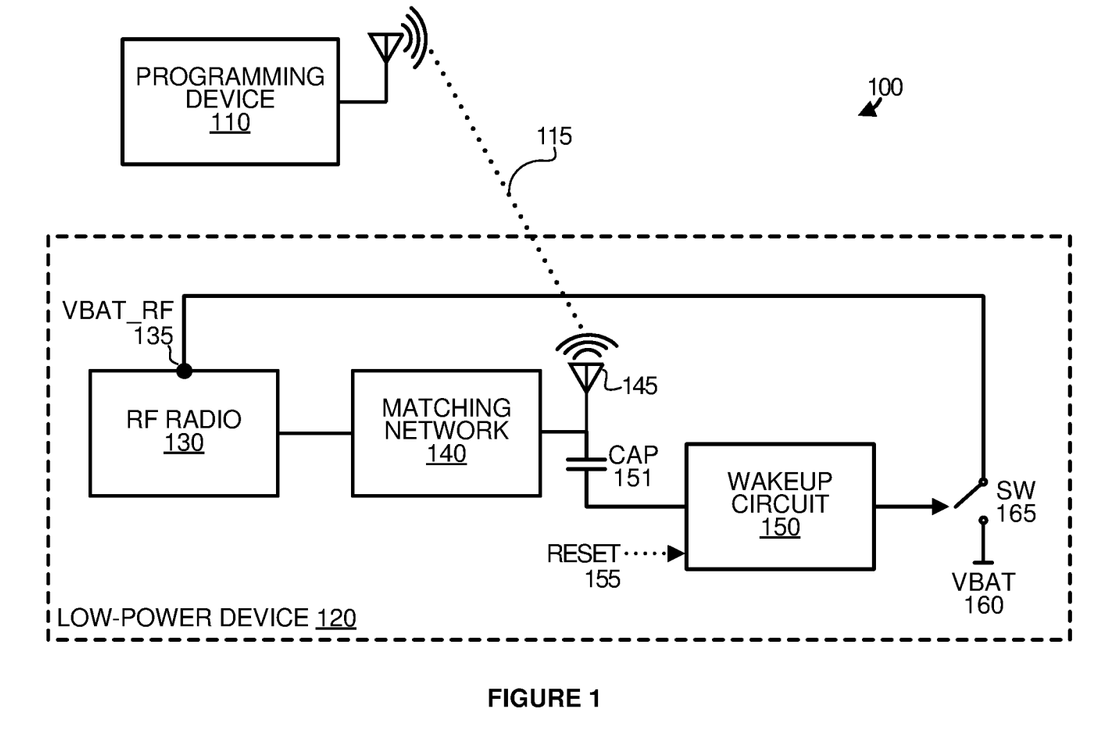
FIG. 1 depicts a block diagram illustrating an example operational architecture for wirelessly waking up low-power device for factory programming, according to some embodiments.

FIG. 1 depicts a block diagram illustrating an example operational architecture 100 for wirelessly waking up low-power device 120, according to some embodiments. As shown in the example of FIG. 1, low-power device 120 is wirelessly awoken for factory programming. However, it is appreciated that the low-power device can be waken up for other purposes including permanent wake-up into a product or normal mode of operation.

As shown in the example of FIG. 1, operational architecture 100 includes programming device 110 and low-power device 120. Low-power device 120 includes RF radio 130, matching network 140, RF antenna 145, coupling capacitor 151, wakeup circuit 150, battery 160 and battery switch 165. Although not shown in the example of FIG. 1, depending on the type of device, low-power device 120 can include one or more additional components such as processors, controllers, memories, etc. Additionally, one or more components can be included in the wakeup circuit 150, e.g., coupling capacitor 151 or battery switch 165. Additional or fewer components are possible.

RF radio 130 can be, for example a BLE or Wi-Fi chip or system-on-a-chip (SoC). By default, e.g., at manufacture time, power to RF radio 130 is disabled to avoid current leakage which, as discussed above, can significantly decrease the shelf life of low-power device 120. Auxiliary wakeup path from RF antenna 145 is included to wake up the low-power device 120 for factory programming when directed by programming device 110. The programming device can be any system or combination of systems capable of establishing a communication link with the low-power device 120 and transferring programming instructions.

The auxiliary wakeup path includes various components for temporarily waking up low-power device 120 for factory programming. As shown in the example of FIG. 1, the components of the auxiliary wakeup path include coupling capacitor 151, wakeup circuit 150 and switch 165. Coupling capacitor 151 provides a capacitive voltage division from RF antenna 145. The coupling capacitor is selected to be much smaller than a capacitor in a matching network 140 so that the effect of the wakeup path components input impedance becomes much less than the matching network tuning capacitor so as to not impact tuning, increase loss, or degrade linearity of the system. In some embodiments, the matching network 140 is provided in a reference design associated with the RF radio and can include circuitry, e.g., one or more capacitors and inductors.

Referring again to FIG. 1, the divided voltage is connected to the input of wakeup circuit 150. In some embodiments, a switch is located at the input of the wakeup circuit which is shorted to ground when the RF radio 130 is enabled.

In operation, programming device 110 transmits a RF signal 115 to low-power device 120 to temporarily wake the device up for factory programming. As discussed herein, the low-power device 120 is initially in a 'sleep/ship' mode with battery 160 disconnected to prevent current leakage and thereby extend the shelf life of the device. In some embodiments, the RF signal can be an amplitude modulation signal on a 2.4-GHz carrier, e.g., with 100% modulation depth. Other modulation depths and carrier frequencies are possible and may be dependent on the type of RF radio 130, e.g., BLE, Wi-Fi, etc.

The RF signal 115 is received by RF antenna 145 and passed to wakeup circuit 150 which detects the presence of a RF field and responsively enables pattern detector circuitry. If a pattern is detected, the wakeup circuit 150 connects the battery input (VBAT_RF 135) of the RF radio 130 to battery 160 to wake up the RF radio 130 for factory programming Additionally, the switch located at the input of wakeup circuit 150 is shorted to ground (see switch 205 of FIG. 2) to eliminate the impact of the wakeup circuit 150 on the linearity and matching of the RF radio 130. Once programming is complete, RF radio 130 or some other components of low-power device 120 can assert reset 155 to disconnect the battery input (VBAT_RF 135) of the RF radio 130 from battery 160 and return low-power device 120 to a 'sleep/ship' mode.

Figure 2:
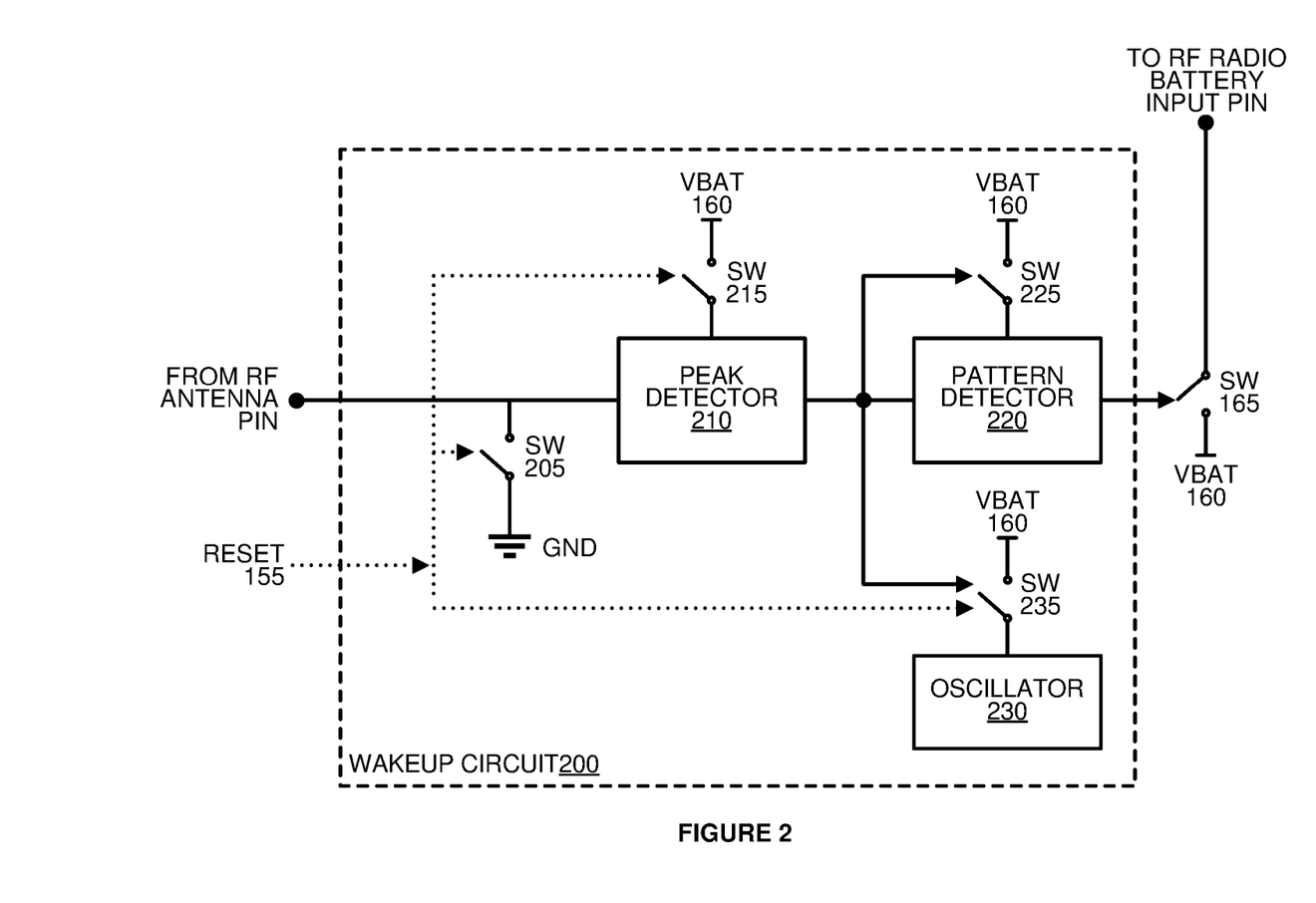
FIG. 2 depicts example components of a wakeup circuit, according to some embodiments.

FIG. 2 depicts example components of a wakeup circuit 200, according to some embodiments. The wakeup circuit 200 can be wakeup circuit 150 of FIG. 1, although alternative configurations are possible. As illustrated in the example of FIG. 2, the wakeup circuit 200 includes a peak detector circuitry 210, pattern detector circuitry 220, an oscillator 230, and switches 205, 215, 225, and 235. Other components are also possible.

The peak detector circuitry 210 detects the presence of any RF field when enabled. Typically, the peak detector circuitry 210 is enabled by default at manufacturing time, i.e., prior to programming by closing switch 215 so that the circuitry receives power from battery 160. However, in some embodiments, some or all components of the wakeup circuit 200 can be powered by harvesting energy. In some embodiments, switch 215 and VBAT 160 might not be used for peak detector circuitry 210.

When a RF signal is received, the peak detector circuitry 210 detects a RF field and enables pattern detector circuitry 220 and oscillator 230 by closing switches 225 and 235, respectively. The oscillator 230 is enabled to facilitate detection of the time pattern. In some embodiments, the peak detector circuitry 210 detects a RF field only when a magnitude of the measured RF field is greater than a threshold value to, for example, ensure that the RF field is more than ambient noise.

Once enabled, the pattern detector circuitry 220 monitors for a time pattern in the received RF signal. For example, the RF signal can be an amplitude shift keying (ASK) signal including a time pattern, e.g., 100% modulation depth amplitude modulation on a carrier signal. Additionally, the frequency of the carrier signal can be dependent on the type of embedded RF radio. For example, a BLE radio can use a 2.4-GHz carrier signal.

If a pattern is detected, the pattern detector 220 connects the battery input of the RF radio 130 to battery 160 to wake up the RF radio for factory programming the low-power device. The switch 205 located at the input of wakeup circuit 150 is then shorted to ground to eliminate the impact of the wakeup circuit 200 on the linearity and matching of the RF radio.

Once programming is complete, the RF radio or some other components of the low-power device assert reset 155 to disconnect the battery input of the RF radio 130 from battery 160 and return low-power device 120 to a 'sleep/ship' mode. Depending on whether wakeup circuit 200 will be used again, switch 205 may remain closed or may be opened. For example, if wakeup circuit 200 is not to be used again, switch 205 will remain closed.

Figure 3:
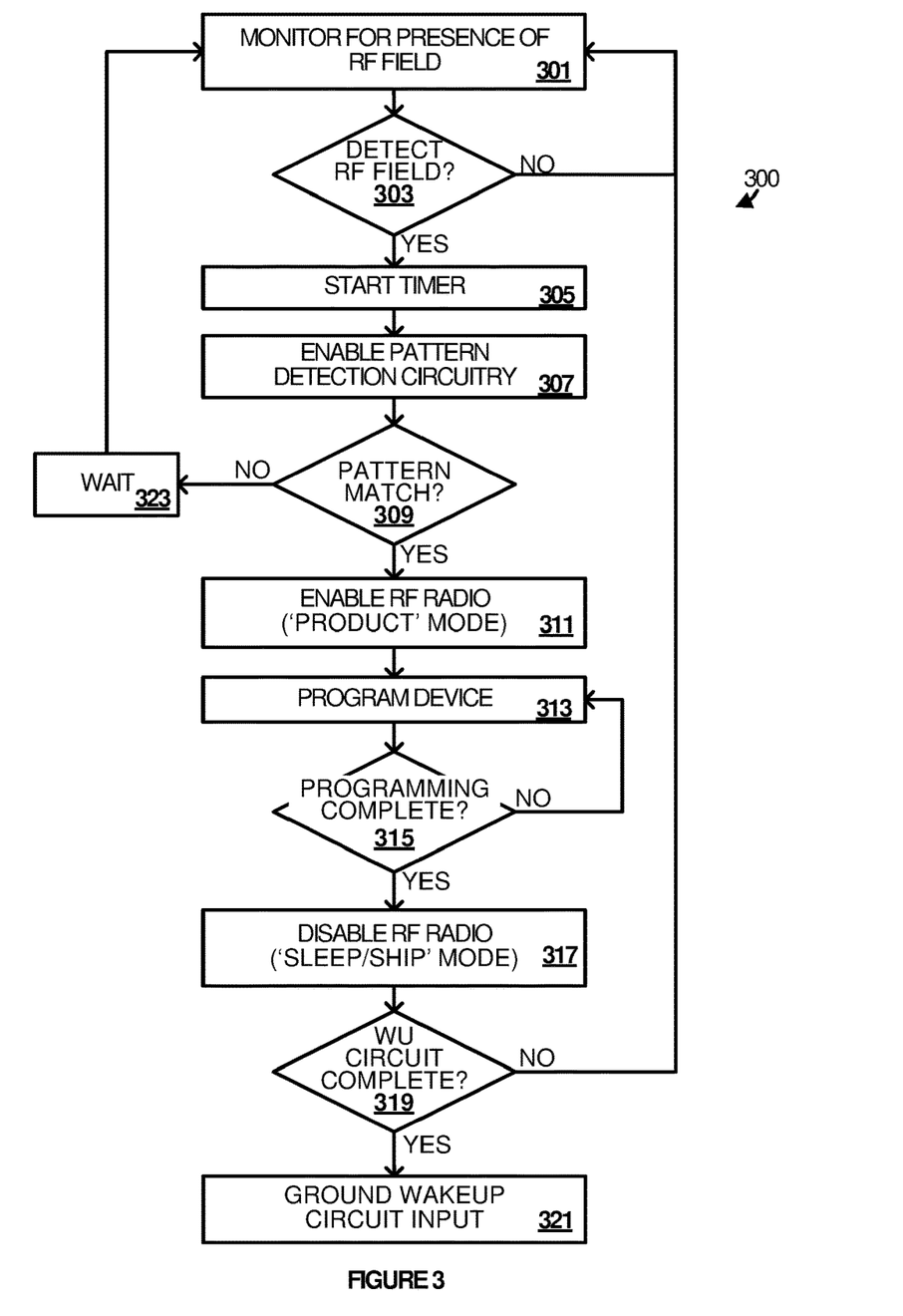
FIG. 3 depicts a flow diagram illustrating example operations of a wakeup circuit for temporarily waking up a low-power device for factory programming, according to some embodiments.

FIG. 3 depicts a flow diagram illustrating example operations 300 of a wakeup circuit for temporarily waking up a low-power device for factory programming, according to some embodiments. More specifically, the example of FIG. 3 depicts operations of an auxiliary wakeup path of a low-power device for waking up a low-power device for factory programming using the low-power device's existing antenna. The example operations 300 may be performed in various embodiments by a wakeup circuit of a low-power device such as, for example, wakeup circuit 150 of low-power device 120 of FIG. 1, or one or more microcontrollers, modules, engines, or components associated therewith.

To begin, at 301, the wakeup circuit monitors for presence of a RF field. For example, a programming device such as programming device 110 of FIG. 1 transmits a RF signal to a low-power device including the wakeup circuit to temporarily wake-up the low-power device for factory programming. In some embodiments, the RF signal includes an amplitude shift keying (ASK) time pattern. ASK is a signal transform methodology whereby the carrier signal amplitude changes abruptly depending on the discrete data messages. In some embodiments, e.g., in the case of a BLE antenna, the RF signal can be a 100% modulation depth amplitude modulation signal on a 2.4-GHz carrier.

At decision 303, the wakeup circuit determines if a RF field is detected. If a field is not detected, the wakeup circuit continues to monitor for presence of a RF field. However, if a RF field is detected, at 305, the wakeup circuit starts a timer. At 307, the wakeup circuit enables pattern detection circuitry and an oscillator which facilitates detection of a time pattern. At decision 309, the wakeup circuit determines if a RF pattern is detected. In some embodiments, the RF pattern can be one or more pre-determined time patterns.

If a preset (or correct) pattern is not detected, at 323, the wakeup circuit waits for a predetermined amount of time before returning to monitor for the presence of an RF field. In this manner, the wakeup circuit can avoid battery drain that occurs as a result of RF signals that are not intended to wake up the low-power device.

If a pattern is detected, at 311, the wakeup circuit enables the RF radio. In some embodiments, enabling the RF radio includes entering a 'product' mode by providing the RF radio with power. Once powered up, at 313, the RF radio communicates with the programming device to send and receive information including programming instructions or information. At 315, the wakeup circuit determines if factory programming is complete. In some embodiments, the RF chip or a microcontroller sends an interrupt (or reset) to the wakeup circuit indicating completion of factory programming. In other embodiments, the reset can occur after a predetermined amount of time, e.g., program timeout.

Once complete, at 317, the wakeup circuit disables the RF radio. In some embodiments, disabling the RF radio includes re-entering a 'sleep/ship' mode by disconnecting the RF radio from power. At decision 319, the wakeup circuit determines whether it will be used again for waking up the device. If so, the wakeup circuit continues to monitor for the presence of a RF field. Otherwise, at 321, the wakeup circuit input is disabled, e.g., by closing switch 205 of FIG. 2.

Figure 4:
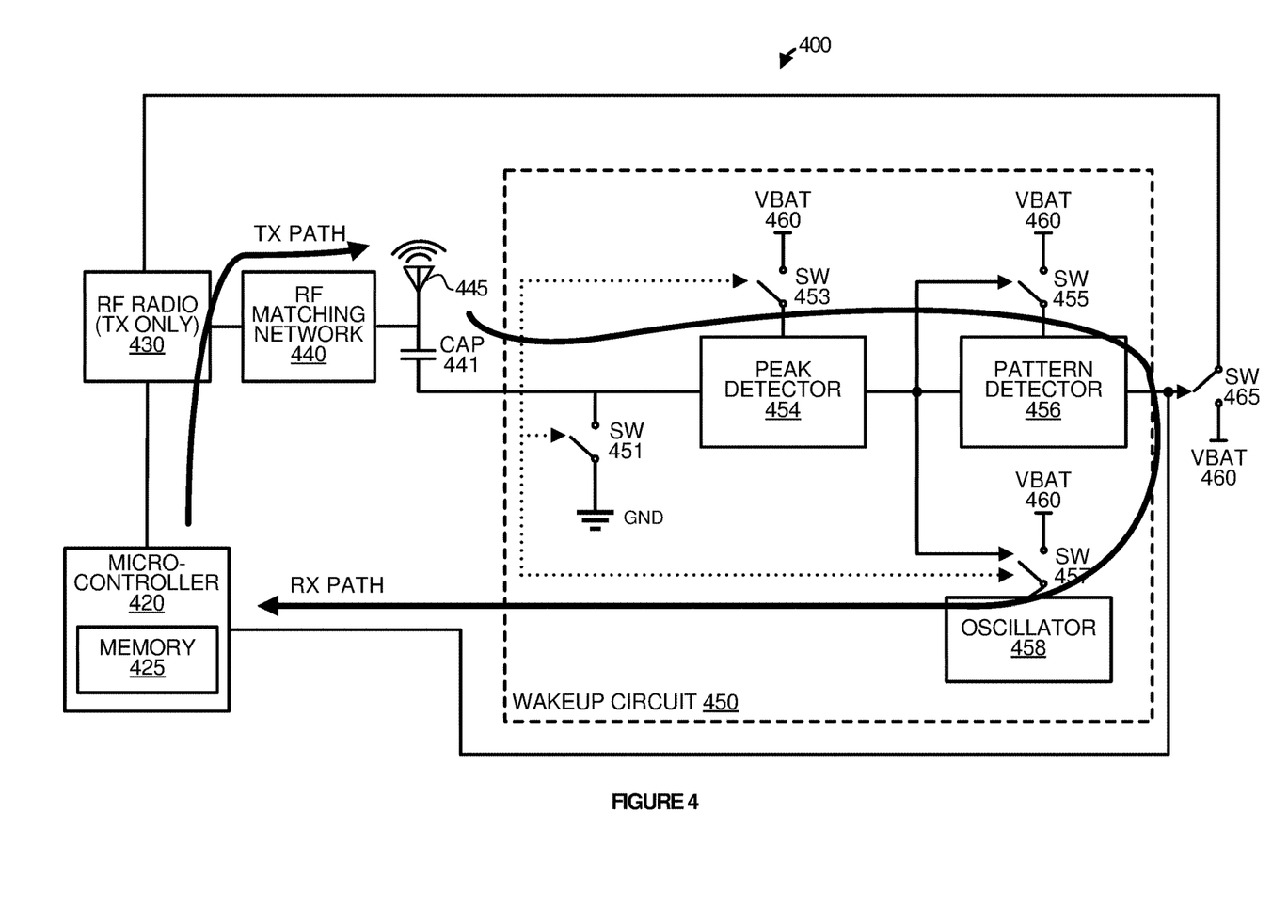
FIG. 4 depicts a block diagram illustrating example components of a low-power device, according to some embodiments.

FIG. 4 depicts a block diagram illustrating example components of a low-power device 400, according to some embodiments. More specifically, the example of FIG. 4 illustrates auxiliary wakeup path components for waking up and factory programming a low-power device 400 having a transmit-only RF radio 430.

As shown in the example of FIG. 4, the low-power device 400 includes microcontroller 420, transmit-only RF radio 430, RF matching network 440, RF antenna 445, capacitor 441, wakeup circuit 450, battery 460 and external switch 465. Although not shown within wakeup circuit 450, it is appreciated that one or more components can be included in the wakeup circuit 450, e.g., capacitor 441 or switch 461. Additional or fewer components are possible. Wakeup circuit 450 is similar to wakeup circuit 200 of FIG. 2 but is capable of processing programming data received from a programming device through ASK time pattern signals.

As discussed herein, bidirectional communication is necessary for wirelessly programming low-power devices. However, to further save on cost and size, some low-power devices include transmit-only RF radios, e.g., BLE transmit-only radios. Currently, these devices are not capable of wireless programming because they are unable to receive programming instructions or information. Accordingly, wakeup circuit 450 is capable of receiving data from a programming device.

In operation, a programming device transmits a RF signal to low-power device 400 to temporarily wake the device up for factory programming. The wakeup circuit 450 receives the RF signal and wakes up transmit-only RF radio 430 as discussed herein. The transmit-only RF radio 430 then transmits beacons that are received by the programming device.

After beaconing, the auxiliary wakeup path is re-enabled and the programming device sends data to the low-power device through ASK time pattern signals. Using this scheme, the auxiliary wakeup path can enable bidirectional communication on a low-power device with a transmit-only RF radio, i.e., the low-power device receives data via the auxiliary wakeup path and transmits data via the RF radio. Handshaking can occur directly between the transmit-only RF radio 430 and wakeup circuit 450 to enable/disable and disable/enable transmit and receive paths, respectively. Alternatively, microcontroller 420 can facilitate the handshaking during factory programming.

The microcontroller 420 can be a small computer or other circuitry that retrieves and executes software from memory 425. The microcontroller 420 may be implemented within a single device or system-on-a-chip (SoC) or may be distributed across multiple processing devices that cooperate in executing program instructions. Although not shown in the example of FIG. 4, microcontroller 420 can include a communication interface and a processing system for performing a primary function, e.g., medical device related. As shown, the microcontroller 420 is operatively or communicatively coupled with transmit-only RF radio 430. Memory 425 can include program memory and data memory.

Figure 5:
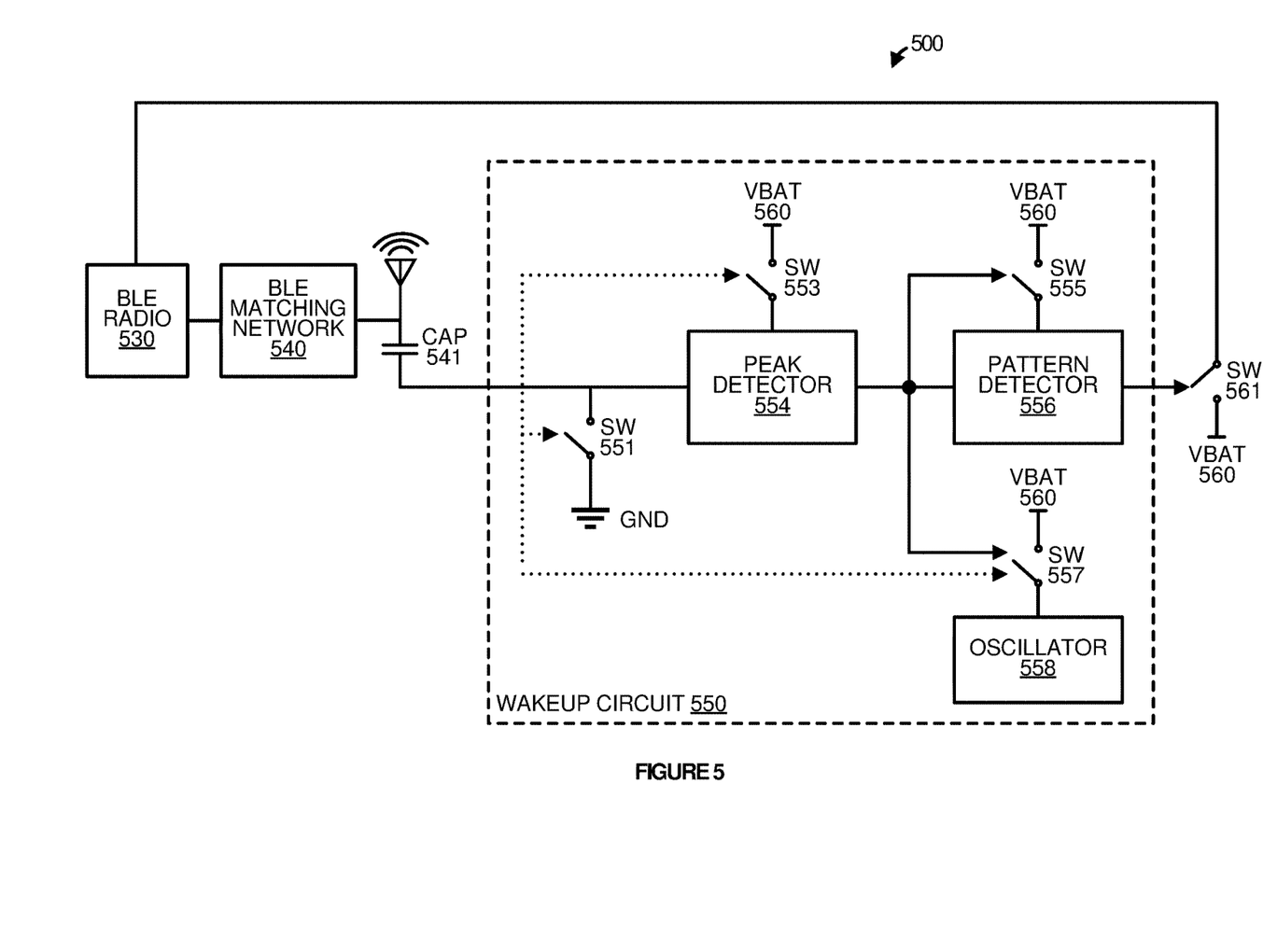
FIG. 5 depicts a block diagram illustrating example components of a low-power device, according to some embodiments.

FIG. 5 depicts a block diagram illustrating example components of a low-power device 500, according to some embodiments. More specifically, the example of FIG. 5 illustrates auxiliary wakeup path components for waking up and factory programming low-power device 500. The example of FIG. 5 is similar to the examples of FIGS. 1 and 2 with a BLE radio 530.

Figure 6:
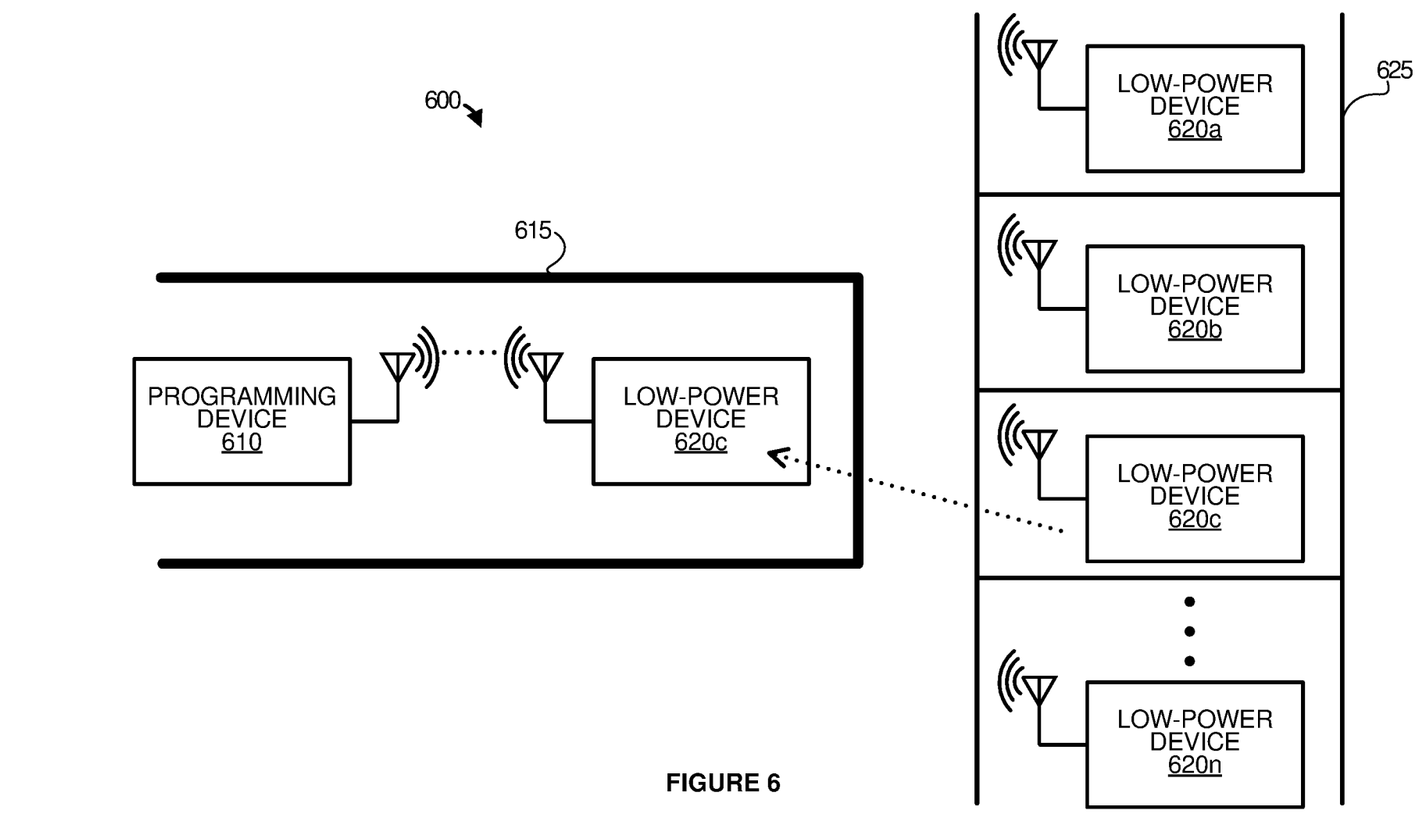
FIG. 6 depicts a block diagram illustrating an example operational architecture for wirelessly waking up low-power device 620c for factory programming, according to some embodiments.

FIG. 6 depicts a block diagram illustrating an example operational architecture 600 for wirelessly waking up low-power device 620c for factory programming, according to some embodiments.

As shown in the example of FIG. 6, operational architecture 600 includes programming device 610, low-power devices 620a-620n, RF shield 615 and shelf 625. The programming device 610 can be programming device 110 of FIG. 1, although alternative configurations are possible. Likewise, each low-power device 620a-620n can be a low-power device 120 of FIG. 1, although alternative configurations are possible.

In some embodiments, RF interference from other devices can mask detection of the time pattern by a low-power device under factory program. A RF shield 615, e.g., a metallic box can be used to avoid such interference in a controlled environment, e.g., in a lab or factory manufacturing line. In such instances, the programmable device 610 and the low-power device 120 are both placed inside the RF shield 615 to avoid interference from other RF interfering signals during wakeup and factory programming.

In some embodiments, the time patterns are the same for all devices and/or otherwise conveyed to the programming device 610 prior to programming. Alternatively, QR codes or other identifiers can be placed on the low-power devices 620a-620n to indicate or otherwise identify a time pattern or code for waking up a particular low-power device.

Figure 7:
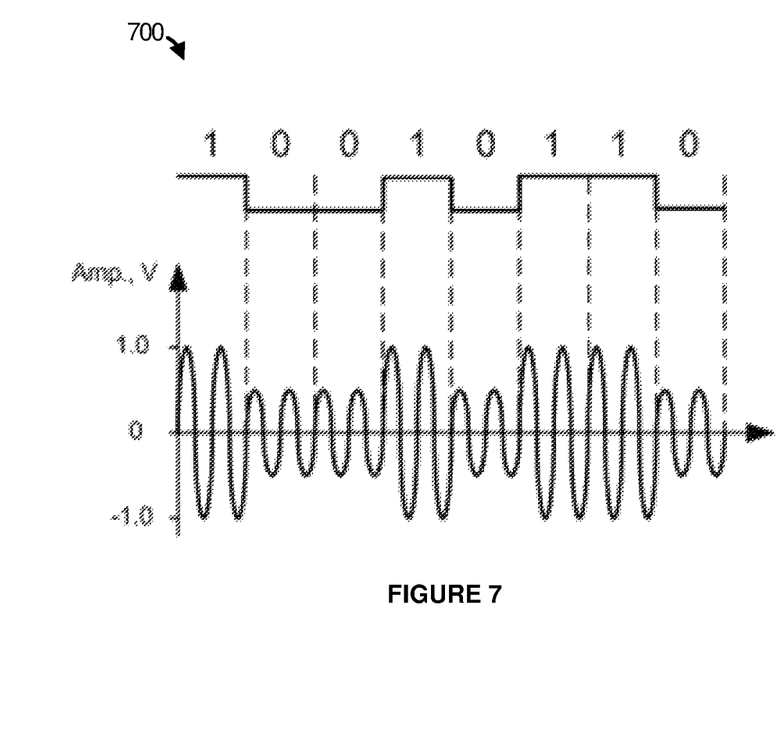
FIG. 7 depicts an example ASK signal chart capable of transmitting a time pattern to a low-power device, according to some embodiments.

FIG. 7 depicts an example ASK signal chart 700 capable of transmitting a time pattern to a low-power device, according to some embodiments.

More specifically, the example ASK signal chart 700 depicts zeros and unities binary order as well as the relevant ASK signal chart. To code the binary signal low level −0.5 Vpp is used, to code the high level—sinusoidal carrier signal 1 Vpp. The ASK signaling shown in the example of FIG. 7 is not 100% ASK, however as noted above, 100% ASK time patterns can also be utilized by the system.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An auxiliary path for temporarily waking up a radio frequency (RF) radio of a low-power device, the auxiliary path comprising:
   peak detector circuitry operable to detect presence of a RF field at a RF antenna of the low-power device;
   pattern detector circuitry enabled by the presence of the RF field and operable to detect a time pattern in an amplitude envelope of a wakeup signal received from a wakeup device at the RF antenna of the low-power device; and
   a battery switch operable to connect battery power to the RF radio when the time pattern is detected,
      wherein, once powered, the RF radio establishes communication with the wakeup device.

2. The auxiliary path of claim 1, further comprising:
   a second switch operable to disable the auxiliary path in response to connecting the battery power to the RF radio.

3. The auxiliary path of claim 2, further comprising:
   a capacitor communicatively coupled to the second switch and the RF antenna and operable to divide voltage from the RF antenna,
      wherein impedance of the capacitor is relatively small compared to an impedance of a matching network for the RF radio.

4. The auxiliary path of claim 1, wherein the RF radio comprises a transmit-only radio.

5. The auxiliary path of claim 4, further comprising:
   an auxiliary path receiver operable to receive programming data from a programming device via amplitude shift keying (ASK) time pattern signals.

6. The auxiliary path of claim 1, wherein the wakeup signal comprises amplitude shift keying (ASK) time pattern signals.

7. The auxiliary path of claim 1, wherein the RF radio comprises one or more of a BLE radio or a Wi-Fi radio.

8. The auxiliary path of claim 1, wherein the wakeup device comprises a programming device operable to factory program the low-power device once the communication is established.

9. The auxiliary path of claim 1, further comprising:
   energy harvesting circuitry operable to harvest the battery power to the RF radio of the low-power device when the time pattern is detected.

10. A low-power device comprising:
    a radio frequency (RF) antenna;
    a RF radio coupled to the RF antenna;
    an auxiliary path coupled to the RF antenna and adapted to incrementally enable circuitry to temporarily wakeup the RF radio, the circuitry comprising:

a peak detector unit operable to detect presence of a RF field at the RF antenna;

a pattern detector unit enabled by the presence of a RF field and operable to detect a pattern in a wakeup signal received from a wakeup device at the RF antenna; and a switch operable to supply battery power to the RF radio when the pattern is detected, wherein, once powered, the RF radio is adapted to establish communications with the wakeup device.

11. The low-power device of claim 10, wherein the pattern comprises a time pattern in an amplitude envelope of the wakeup signal.

12. The low-power device of claim 10, wherein the circuitry further comprises:

a second switch operable to disable the auxiliary path in response to connecting the battery power to the RF radio; and a capacitor coupled to the second switch and the RF antenna and operable to divide voltage from the RF antenna, wherein impedance of the capacitor is relatively small compared to an impedance of a matching network for the RF radio.

13. The low-power device of claim 10, wherein the RF radio comprises a transmit-only radio, and wherein the circuitry further comprises an auxiliary path receiver operable to receive programming data from a programming device via amplitude shift keying (ASK) time pattern signals.

14. The low-power device of claim 10, wherein the wakeup signal comprises amplitude shift keying (ASK) time pattern signals.

15. The low-power device of claim 10, wherein the wakeup device comprises a programming device operable to perform factory program the low-power device once the communication is established.

16. The low-power device of claim 10, wherein the circuitry further comprises:

an energy harvesting unit operable to harvest the battery power to the RF radio when the time pattern is detected.

17. A method of operating an auxiliary path for temporarily waking up a radio frequency (RF) radio of a low-power device, the method comprising:

monitoring for presence of a RF field at a RF antenna of the low-power device while the low-power device is in a sleep or ship mode;

in response to sensing the presence of a RF field at the RF antenna, enabling pattern detection circuitry to detect a time pattern in an amplitude envelope of a wakeup signal received at the RF antenna;

in response to detecting the time pattern, supplying battery power to the RF radio; and once the RF radio is powered, establishing communication with a wakeup device to receive instructions for performing factory programming.

18. The method of claim 17, further comprising:

determining that the factory programming is complete; and in response to determining that the factory programming is complete, disabling the battery power to the RF radio.

19. The method of claim 18, further comprising:

after determining that the factory programming is complete, disabling the auxiliary path.

* * * * *